United States Patent
Gorke et al.

(10) Patent No.: US 10,160,912 B2
(45) Date of Patent: Dec. 25, 2018

(54) PROCESSES FOR PYROLYSIS VAPOR UPGRADING

(71) Applicant: PHILLIPS 66 COMPANY, Houston, TX (US)

(72) Inventors: Johnathan T. Gorke, Owasso, OK (US); Edgar Lotero, Cleveland, OK (US)

(73) Assignee: Phillips 66 Company, Houston, TX (US)

( * ) Notice: Subject to any disclaimer, the term of this patent is extended or adjusted under 35 U.S.C. 154(b) by 579 days.

(21) Appl. No.: 14/465,902

(22) Filed: Aug. 22, 2014

(65) Prior Publication Data

US 2015/0073181 A1 Mar. 12, 2015

Related U.S. Application Data

(60) Provisional application No. 61/876,485, filed on Sep. 11, 2013.

(51) Int. Cl.

| | |
|---|---|
| *C10G 1/00* | (2006.01) |
| *C10G 3/00* | (2006.01) |
| *C10B 49/00* | (2006.01) |
| *C10G 65/12* | (2006.01) |
| *C10B 49/16* | (2006.01) |
| *C10B 53/02* | (2006.01) |

(52) U.S. Cl.
CPC ............ *C10G 1/002* (2013.01); *C10G 3/42* (2013.01); *C10G 3/50* (2013.01); *C10G 65/12* (2013.01); *C10B 49/16* (2013.01); *C10B 53/02* (2013.01); *Y02E 50/14* (2013.01); *Y02P 20/145* (2015.11); *Y02P 30/20* (2015.11)

(58) Field of Classification Search
CPC ............ C10G 61/02; C10G 65/14; C10L 1/04
See application file for complete search history.

(56) References Cited

U.S. PATENT DOCUMENTS

2009/0294324 A1* 12/2009 Brandvold ................ C10L 1/04
208/17

OTHER PUBLICATIONS

Mohan, D. et al., Pyrolysis of wood/biomass for bio-oil: A critical review, 2006, Energy and Fuels, vol. 20, pp. 848-889.*

* cited by examiner

*Primary Examiner* — Youngsul Jeong
(74) *Attorney, Agent, or Firm* — Phillips 66 Company (57) ABSTRACT

This disclosure relates to the fast pyrolysis of organic matter. More specifically, it relates to the catalytic modification of vapors created during the fast pyrolysis of organic matter to create transportation fuel or a transportation fuel component. At least a first portion of pyrolysis vapors is catalytically stabilized or converted, then combined with a portion of raw, unconverted bio-derived pyrolysis vapors at a temperature and pressure sufficient for molecules of the combined vapors to react and produce hydrocarbons of increased molecular weight that are suitable for use as a hydrocarbon transportation fuel or component thereof.

8 Claims, 3 Drawing Sheets

PROCESSES FOR PYROLYSIS VAPOR UPGRADING

CROSS-REFERENCE TO RELATED APPLICATIONS

This application is a non-provisional application which claims benefit under 35 USC § 119(e) to U.S. Provisional Patent Application Ser. No. 61/876,485 filed Sep. 11, 2013, entitled "PROCESSES FOR PYROLYSIS VAPOR UPGRADING", and incorporated herein in its entirety.

STATEMENT REGARDING FEDERALLY SPONSORED RESEARCH OR DEVELOPMENT

None.

FIELD OF THE DISCLOSURE

This disclosure relates to methods for the fast pyrolysis of organic matter. More specifically, it relates to the catalytic modification of vapors created during the fast pyrolysis of organic matter to create transportation fuel or a transportation fuel component.

BACKGROUND

The U.S. Renewable Fuel Standards (RFS) mandate requires increasing volumes of advanced biofuels to be produced. One method being developed to meet this mandate is the fast pyrolysis of biomass. Conventional biomass fast pyrolysis requires rapid heating of biomass in the absence of oxygen. Products include a solid carbonaceous char that retains the vast majority of metals (e.g. Na, K, Mg) present in the biomass feedstock. Conventional fast pyrolysis also produces oxygenated pyrolysis vapors that are highly reactive, and product compounds comprising radicals can lead to rapid, uncontrolled oligomerization or polymerization to form large molecular weight compounds that are extremely difficult to upgrade to transportation fuels. There is a need to improve fast pyrolysis technology to allow for rapid stabilization or upgrading of the raw pyrolysis vapors to prevent uncontrolled polymerization, while still allowing some intermolecular addition reactions to proceed, thereby efficiently producing hydrocarbons having molecular weights and characteristics fungible with current hydrocarbon transportation fuels, while simultaneously preventing char and associated catalyst poisons from contacting upgrading catalysts that convert these primary products.

BRIEF SUMMARY OF THE DISCLOSURE

In certain embodiments, the inventive disclosure pertains to a process for producing biomass derived hydrocarbon fuel, or fuel component, comprising the steps: (a) Providing a first portion of bio-derived pyrolysis vapors and a second portion of biomass-derived pyrolysis vapors; (b) at least partially stabilizing the first portion of bio derived pyrolysis vapors by reacting with at least one catalyst to produce stabilized pyrolysis vapors that are less active for oligomerization and polymerization; (c) combining the stabilized pyrolysis vapors with the second portion of biomass derived pyrolysis vapors at a temperature and pressure sufficient for molecules of the combined vapors to react and produce hydrocarbons having molecular weights that are within the boiling range of at least one of gasoline, diesel and gasoil and that are suitable for use as a hydrocarbon transportation fuel or component thereof, without producing molecules with a carbon number greater than about 35 that are unsuitable for use as a transportation fuel or a component thereof.

In certain embodiments of the process, multiple catalysts may be used and may be arranged in parallel, in series or as mixtures of catalysts in one or more reactors or reaction zones. In these embodiments, each catalyst or mixture of catalysts may contact the first portion under different conditions wherein each catalyst is in a reaction zone maintained at a temperature and pressure that optimizes the reactions taking place therein. Certain of the catalysts may facilitate reactions other than stabilization.

Certain embodiments of the process additionally hydrotreat the product hydrocarbons resulting from combining the stabilized pyrolysis vapors with the second portion of untreated pyrolysis vapors to produce hydrotreated hydrocarbons having molecular weights that are within the boiling range of gasoline, diesel and gasoil and that are suitable for use as a hydrocarbon transportation fuel.

The inventive disclosure optionally comprises pyrolyzing a biomass feedstock to form pyrolysis vapors and char, and dividing the pyrolysis vapors to provide the first and second portion of biomass-derived pyrolysis vapors.

The pyrolysis vapors typically comprise one or more of: aromatic monomers, furan monomers, anhydrosugar monomers, olefins, alcohols, aldehydes, carboxylic acids, ketones, ethers, esters and hydrocarbons. Optimally, the combining of step (c) occurs less than 1 second, preferably less than 0.25 second, more preferably less than 0.1 second after the portions of pyrolysis vapors are obtained or produced by pyrolysis.

BRIEF DESCRIPTION OF THE DRAWINGS

A more complete understanding of the present invention and benefits thereof may be acquired by referring to the follow description taken in conjunction with the accompanying drawings in which.

The invention is susceptible to various modifications and alternative forms, specific embodiments thereof are shown by way of example in the drawings. The drawings may not be to scale. It should be understood that the drawings and their accompanying detailed descriptions are not intended to limit the scope of the invention to the particular form disclosed, but are illustrative only of specific embodiments.

DETAILED DESCRIPTION

Pyrolysis vapors are known to be highly reactive, and can rapidly form high molecular weight compounds that are above the boiling-point range of typical hydrocarbon transportation fuels (i.e., a carbon number greater than about 35). In certain embodiments of the present disclosure, we found that reducing the concentration of reactive functional groups in a portion of the raw pyrolysis vapors (e.g., by deoxygenation) limits the overall reactivity of that portion. When that portion is recombined with raw pyrolysis vapors, the overall concentration of reactive groups in the mixed stream is reduced. However, some addition reactions can take place to increase overall molecular weight. The effect is that the growth of the product molecules is limited to a desirable size range suitable for use in a transportation fuel. Example of typical addition reactions between compounds typically found in pyrolysis vapors are shown in Schemes 1-3 below:

Scheme 1: Reaction of propionaldehyde (C3) and methyl furan (C5) to form C11 species (A).

Scheme 2: Reaction of propylene (C3) and a vinyl cresol (C9) to form $C_{12}$ species (B).

Scheme 3: Reaction of a vinyl cresol (C9) and a dimethoxy vinyl phenol (C10) to form a C19 species (C).

c

In certain embodiments of the present disclosure, the pyrolysis vapors are obtained from a pyrolysis reactor and then divided into multiple portions. In other embodiments, multiple, distinct portions of pyrolysis vapors may be obtained from the pyrolysis reactor via multiple outlets. These outlets may be located near each other, or placed anywhere along the length of the pyrolysis reactor. At least one portion is catalytically upgraded, and at least one stabilized or upgraded portion is then reacted with an unreacted portion of raw pyrolysis vapors at a temperature and pressure sufficient to form a bio-derived transportation fuel or further-upgraded fuel intermediate that may be further processed or upgraded prior to condensation of the product to a liquid bio-derived transportation fuel or fuel component. The product bio-derived fuel mixture maybe, but is not limited to, gasoline, jet-fuel, diesel and gasoil.

Certain embodiments additionally allow effective catalytic upgrading of biomass-derived pyrolysis vapors while protecting and extending the lifespan of upgrading catalyst(s). This is achieved by preventing contact between the catalyst(s) and the char generated during pyrolysis of the biomass feedstock to form gaseous products including condensable vapors.

The pyrolysis reactor utilized is compatible with any known pyrolysis reactor configuration or technology, including, but not limited to, bubbling bed, circulating bed, moving or fluidized bed, ablative, vacuum, microwave heated, plasma-heated, counter-current, auger or combinations of one or more of these configurations. Preferably, the pyrolysis reactor comprises at least one auger that assists in rapidly and evenly distributing heat to the feedstock, as well as helping to convey the feedstock and an optional heat carrier through the pyrolysis reactor. Rapid heating of the biomass feedstock in an atmosphere containing little or no oxygen results in the thermal breakdown of the feedstock, producing oxygenated hydrocarbon vapors termed pyrolysis vapors. The vapors rise and are driven by a sweep gas (or optionally, a pressure differential) toward an optional disengagement zone that allows separation of the vapors from entrained char, heat carrier, and metals while avoiding vapor condensation. The pyrolysis vapors then exit the pyrolysis reactor via at least one outlet. Optionally, the at least one outlet is located at (or near) the top of the pyrolysis reactor to help prevent the entrainment of char. The large majority of char created by pyrolysis of the feedstock is conveyed through the reactor along with heat carrier by one or more augers, falls by force of gravity into a char catch and is eliminated from the reactor. Preventing entrainment of char prevents fouling/poisoning of catalyst(s) located downstream that are utilized to catalytically upgrade the pyrolysis vapors.

The pyrolysis vapors are then either intermittently or continuously divided into two or more portions. Each portion is conveyed via transport conduits that are maintained at a temperature that prevents condensation of the vapors to liquid phase, preferably a temperature between 250° C. to 500° C., which also prevents thermal coking of the conduits.

In certain embodiments, at least one portion of pyrolysis vapors contacts at least one catalyst to produce an upgraded portion of pyrolysis vapors that is less reactive than the original un-stabilized, raw pyrolysis vapors. Each catalyst bed may comprise a fixed bed, fluidized bed, or moving bed. Each catalyst bed may also comprise mixtures of more than one catalyst, or multiple beds of catalyst in series.

Following the stabilizing, the upgraded pyrolysis vapors are conveyed to a location downstream and combined with a split stream of reactive raw pyrolysis vapors. The combining is performed at a temperature and pressure sufficient for molecules of the combined vapors to react and produce hydrocarbons having molecular weights that are within the boiling range of gasoline, diesel and gasoil. Preferably, the products have a boiling range in the diesel boiling range. Without further upgrading, these product compounds may be suitable for use as a hydrocarbon transportation fuel component (for example, as a blend component at up to about 5-10% (by vol.)

In some embodiments, the at least partial upgrading of at least one portion of the pyrolysis vapors is optimized to leave enough remaining reactivity to facilitate a certain amount of inter-molecular addition reactions once the partially upgraded pyrolysis vapors are combined with raw, reactive pyrolysis vapors. Optimally, such addition reactions do not produce a significant quantity of product molecules having a carbon number greater than about 35 carbons, more preferably, no greater than about 30 carbons. As hydrocarbons of this size are typically unsuitable for use as a transportation fuel or a component thereof, and would have a boiling point above the boiling point range of gasoline, kerosene or jet fuel, diesel #1, #2 or #4 and light fuel oil.

Optionally, in certain embodiments the products may be further upgraded to a bio-derived fuel or fuel component that is fungible with petroleum-derived transportation fuels. For example, in certain embodiments additional oxygen, nitrogen, and sulfur may be removed by conventional hydrotreating processes to produce a finished transportation fuel (as detailed further below). The combining and reacting may occur in a reactor or simply in a suitable length of conduit maintained at a temperature and pressure sufficient to produce a bio-derived fuel, fuel component, or further upgraded fuel intermediate. Each portion of pyrolysis vapors is maintained in vapor phase both prior to, and during, the reacting. The length and or volume of the reaction zone in the conduit or reactor where the reacting occurs is at least partly determined by the kinetics of the reactions occurring between the at least partially-upgraded portion and the portion of raw pyrolysis vapors. These kinetics can be determined by conventional methodology, such as by analyzing the molecular composition of mixtures of partially-upgraded pyrolysis vapors and raw pyrolysis vapors over time at a given temperature and pressure using conventional gas chromatography/mass spectrometry. The size of the reaction zone is optimized such that the average carbon number of product molecules leaving the reaction zone is between 6 and 35, more preferably between 6-30, or within the carbon number range of molecules in the boiling range of transportations fuels such as gasoline, kerosene, jet fuel, diesel #1, #2 or #4 and light fuel oil. Optimization of the average carbon number of the product can be performed based upon the desired specifications of the product fuel. In preferred embodiments, the reacting favors the production of higher molecular weight products in the range of 9 to 16 carbons that when condensed to a liquid are suitable for use in, for example, a diesel fuel or jet fuel.

In certain embodiments, a portion of the product of the reacting (e.g., products with a carbon number below 6, excess hydrogen, etc.) or a portion of one or more of the pyrolysis vapor portions may be returned to the pyrolyzer or to any of the upgrading reactors to be further upgraded or utilized in the upgrading of the pyrolysis vapors.

In certain embodiments, the products of the reacting are further upgraded by hydrotreating, which is familiar to those having skill in the art and further reduces oxygen content of the products while also removing residual sulfur and nitrogen to levels that meet government mandates for a finished transportation fuel. Hydrotreating can be performed in one-step or multiple steps in the presence of conventional hydrotreating catalyst(s) or via other known methods, such as thermal deoxygenation in the presence of a metal hydroxide (e.g., CaOH).

Each portion of pyrolysis vapors may be diluted with a carrier gas that may be the same carrier gas at was utilized in the pyrolysis reactor, or a different gas added downstream from the pyrolysis reactor. The carrier gas may be an inert gas or a reactive gas. If the carrier gas is a reactive gas, it may also serve to facilitate one or more upgrading reactions.

Examples of biomass feedstock used in the present invention include, but are not limited to, oil-containing biomass, such as jatropha plant, macroalgae or microalgae. Carbohydrate-based biomass may also be used as feedstock, where carbohydrate-based refers to biomass where at least a fraction of its composition is made of carbohydrates. Carbohydrate-based biomasses are available from a variety of sources including cellulosic biomass and algal biomass. Specific examples of feedstock useful in the current invention include, but are not limited to: sugars, carbohydrates, fatty acids, proteins, oils, eucalyptus oil, forest residues, dead trees, branches, leaves, tree stumps, yard clippings, wood chips, wood fiber, sugar beets, miscanthus, switchgrass, hemp, corn, corn fiber, poplar, willow, sorghum, sugarcane, palm oil, corn syrup, algal cultures, bacterial cultures, fermentation cultures, paper manufacturing waste, agricultural residues (e.g., corn stover, wheat straw and sugarcane bagasse), dedicated energy crops (e.g., poplar trees, switchgrass, and miscanthus giganteus sugarcane) sawmill and paper mill discards, food manufacturing waste, meat processing waste, animal waste, biological waste and/or municipal sewage.

Figure 1:
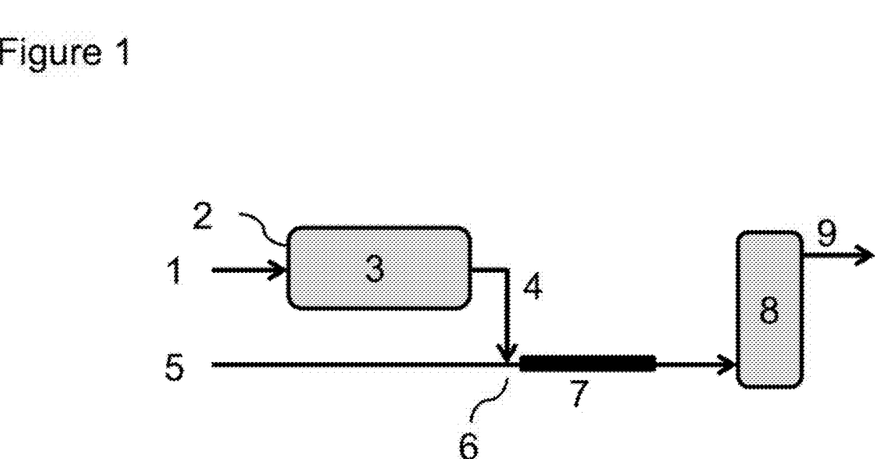
FIG. 1 is a simplified diagram depicting one embodiment of the inventive processes and systems described herein.

FIG. 1 depicts an exemplary embodiment for conducting pyrolysis of organic material or biomass to produce a useful transportation fuel or fuel component. A first portion of raw pyrolysis vapors 1 enters a reactor 2 and contacts a upgrading catalyst 3 therein to produce an upgraded first stream 4 that is less reactive than the first stream of raw pyrolysis vapors 1. The upgrading catalyst 3 may comprise any of a number of different known configurations in the upgrading reactor 2, including a fixed bed, fluidized bed, bubbling bed or moving bed. The upgrading catalyst 3 may also comprise mixtures of more than one catalyst, or multiple beds of catalyst in series.

Further referring to FIG. 1, the upgraded first stream 4 comprises an at least partially-stabilized intermediate stream, and is conveyed to a location downstream 6 where it is combined with a second stream 5 of reactive raw pyrolysis vapors (where the term "raw" is defined as not having been catalytically upgraded). Upon combining the two streams, the highly reactive chemical compounds within the second stream 5 react in a reaction zone 7 with the upgraded first stream 4 to form higher molecular weight, less-reactive species that are suitable for use as a bio-derived fuel component, or that may be easily further converted to compounds fungible with petroleum-derived transportation fuels. In FIG. 1, the reaction zone is a length of conduit downstream from the point where the upgraded first stream 4 and second stream are combined, but in certain embodiments may comprise a reactor. Further, each stream is maintained in vapor phase prior to and during the combining and reacting, and the reaction zone 7 is maintained at a temperature and pressure sufficient to facilitate reactions between the combined streams to produce the previously-mentioned higher molecular weight compounds.

The embodiment depicted in FIG. 1 also includes a hydrotreating step. The product of the reacting in the reaction zone 7 is conveyed to a hydrotreating reactor 8 containing one or more hydrotreating catalysts. Such hydrotreating is conventional in nature and may involve a single-step or multiple steps (as discussed previously). The gaseous product leaving the hydrotreating reactor 8 is suitable for use as a bio-derived transportation fuel, or bio-derived transportation fuel component.

Figure 2:
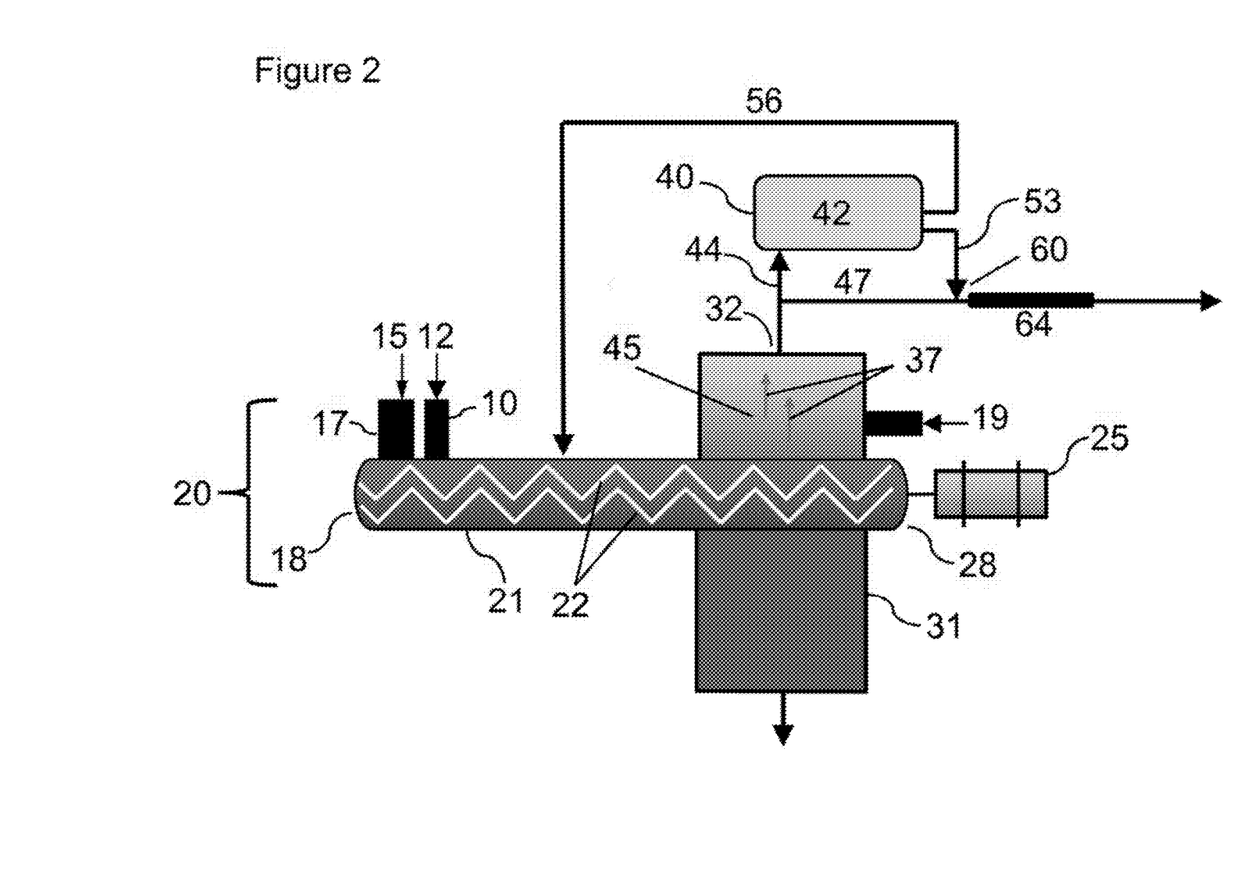
FIG. 2 is a simplified diagram depicting one embodiment of the inventive processes and systems described herein.

FIG. 2 depicts an alternative exemplary embodiment that additionally details methods and systems for production of pyrolysis vapors. A pyrolysis reactor 20 comprises an external housing 21, a heat carrier inlet 17, a biomass feedstock inlet 12 and one or more helical augers 22 that when driven by a motor 25, rotate about a longitudinal axis to convey the biomass feedstock 12 along the length of the external housing 20 from an inlet end portion 18 towards an outlet end portion 28. Near the outlet end portion 28, the char falls into a char catch 31 by gravitational force. The biomass feedstock 12 is heated in the pyrolysis reactor 20 by at least one heating method that may include a heating jacket in the external housing, one or more heated augers, or via introduction of a heat carrier 15 via the heat carrier inlet 17 proximal the inlet end portion 18. The pyrolysis reactor is typically operated to exclude most oxygen or air by the introduction of a sweep gas. In the embodiment shown in FIG. 2, a sweep gas enters through sweep gas inlet 19, although the sweep gas may alternatively enter the system via other points of entry, such as the biomass feedstock inlet 10 or heat carrier inlet 17. As the biomass feedstock 12 is rapidly heated, pyrolysis vapors 37 rise into the upper portion of the pyrolysis reactor 20 and are swept toward the outlet end portion 28, exiting through a first outlet 32, preferably located near the top of the reactor to help prevent solids from leaving the reactor via this outlet. Alternative embodiments may comprise additional outlets that are not depicted in FIG. 2.

Further referring to the embodiment depicted in FIG. 2, the pyrolysis vapors exiting through first outlet 32 are then either intermittently or continuously split into a first portion 44 and a second portion 47. The first portion enters an upgrading reactor 40 and contacts an upgrading catalyst 42 therein to produce an upgraded first portion 53 that is less reactive than the pyrolysis vapors 37. The upgrading catalyst 42 may comprise a number of different configurations, including a fixed bed, fluidized bed, bubbling bed or moving bed. The upgrading catalyst 42 may also comprise mixtures of more than one catalyst, or multiple beds of catalyst in series.

Further referring to FIG. 2, the upgraded first portion 53 produced in upgrading reactor 40 comprises a bio-derived fuel, fuel component, or an upgraded fuel intermediate, and is conveyed to a location 60 where it is reacted with the second portion 47 of reactive raw pyrolysis vapors that has not been catalytically upgraded. The highly reactive chemical compounds within the second portion 47 react in a reaction zone 64 with the upgraded first portion 53 to form higher molecular weight, less-reactive molecular species that when condensed to liquid, are suitable for use as a bio-derived fuel or that may be easily further converted to compounds fungible with petroleum-derived transportation fuels. In FIG. 2, the reaction zone is a length of conduit. Further, each portion is maintained in vapor phase prior to and during the reacting, and the reaction zone 64 is maintained at a temperature and pressure sufficient to produce the previously mentioned higher molecular weight compounds.

When the pyrolysis reactor described herein comprises an auger, the reactor is more efficient in char removal than a conventional fluidized bed reactor, which produces char fines by attrition of larger char particles that then elutriate into the produced pyrolysis vapors. Referring again to the embodiment shown in FIG. 2, the majority of char formed during pyrolysis is conveyed by the at least one auger along with heat carrier (not depicted) towards the second end portion 28 of the pyrolysis reactor 20. The large majority of char and heat carrier fall together into a char catch 31 and are removed and optionally recycled to process or disposed of Thus, the char is prevented from becoming entrained in the pyrolysis vapors exiting via the at least one outlet 32, and prevented from entering downstream upgrading reactor 40 and coming in contact with the upgrading catalyst bed 42.

Figure 3:
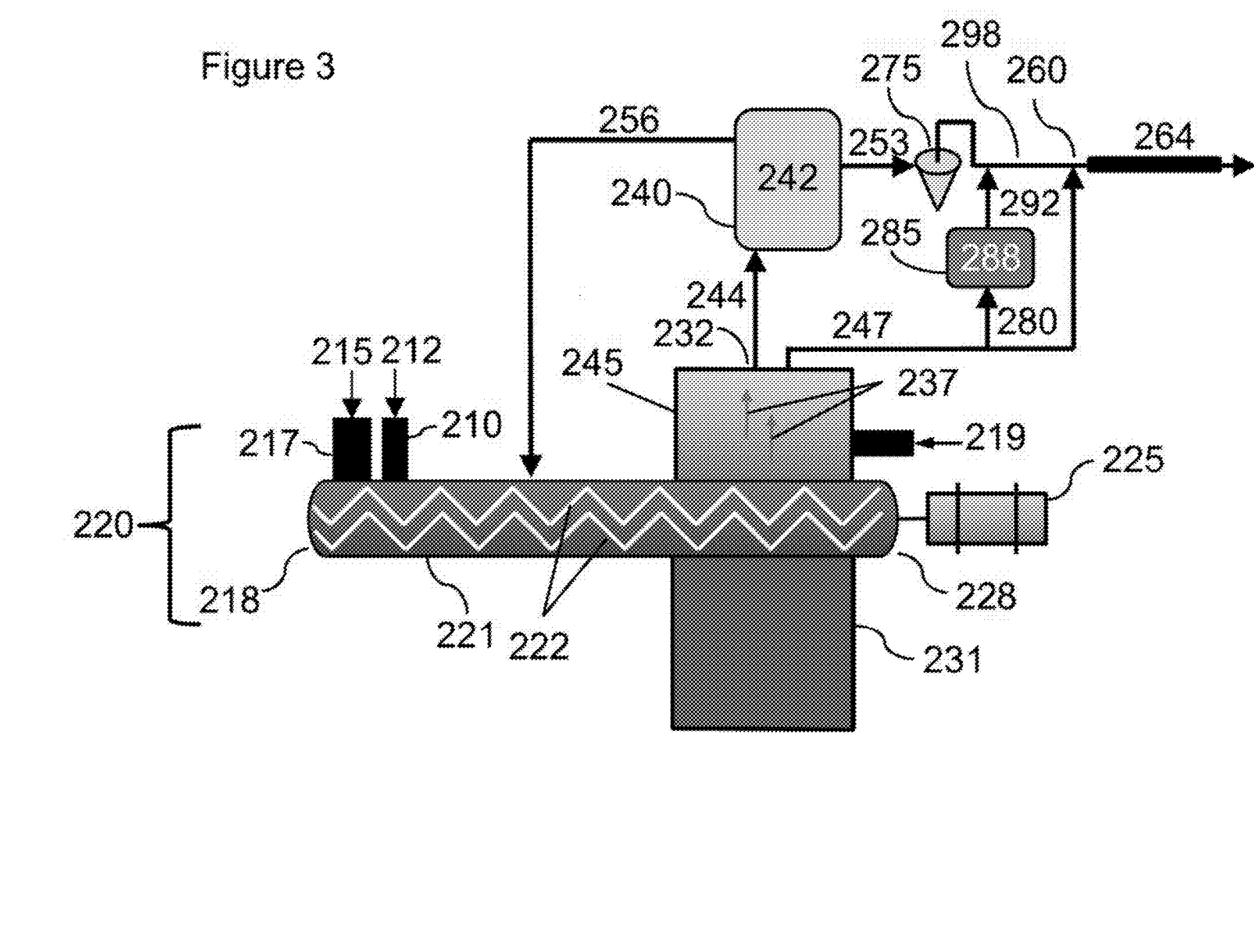
FIG. 3 is a simplified diagram depicting one embodiment of the inventive processes and systems described herein.

FIG. 3 depicts an alternative exemplary embodiment that incorporates multiple upgrading reactors operating in series, followed by reacting the combined upgraded portions. A pyrolysis reactor 220 comprises an external housing 221, a heat carrier inlet 217, a biomass feedstock inlet 212 and one or more helical augers 222 that when driven by a motor 225, rotate about a longitudinal axis to convey the biomass feedstock 212 along the length of the external housing 220 from an inlet end portion 218 towards an outlet end portion 228. Near the outlet end portion 228, the char falls into a char catch 231 by gravitational force. The biomass feedstock 212 is heated in the pyrolysis reactor 220 by at least one heating method that may include a heating jacket in the external housing, one or more heated augers, or via introduction of a heat carrier 215 via the heat carrier inlet 217 proximal the inlet end portion 218. The pyrolysis reactor is typically operated to exclude most oxygen or air by the introduction of a sweep gas. In the embodiment shown in FIG. 3, a sweep gas enters through sweep gas inlet 219, although the sweep gas may alternatively enter the system via other points of entry, such as the biomass feedstock inlet 210 or heat carrier inlet 217. As the biomass feedstock 212 is rapidly heated, pyrolysis vapors 237 rise into the upper portion of the pyrolysis reactor 220 and are swept toward the outlet end portion 228, exiting through a first outlet 232 preferably located near the top of the reactor to help prevent solids from leaving the reactor via this outlet. Alternative embodiments may optionally comprise additional outlets (not depicted).

Further referring to the embodiment depicted in FIG. 3, the pyrolysis vapors exiting through first outlet 232 are then either intermittently or continuously split into a first portion 244 and a second portion 247. The first portion enters the first upgrading reactor 240 and contacts the first upgrading catalyst 242 therein to produce a upgraded first portion 253 that is less reactive than the pyrolysis vapors 237. The first upgrading catalyst 242 contained within the first upgrading reactor 240 may comprise, for example, a fixed bed, fluidized bed, bubbling bed or moving bed. The first upgrading catalyst 242 may also comprise mixtures of more than one catalyst, or multiple beds of catalyst in series.

Further referring to FIG. 3, the second portion 247 is again split to produce a third portion 280 that enters a second upgrading reactor 285 and contacts an second upgrading catalyst 288 therein to produce an upgraded third portion 292 that is less reactive than the pyrolysis vapors 237 or the second portion 247

Further referring to FIG. 3, the upgraded first portion 253 produced in first upgrading reactor 240 comprises a bio-derived fuel, fuel component, or an upgraded fuel intermediate, and is then passed through a device to remove any residual particulates 275 present in the pyrolysis vapors or produced in the first upgrading reactor 240. The device 275 may comprise, for example, a cyclone or an in-line filter. The upgraded first portion 253 then combines with the upgraded second portion 292. This upgraded mixture 298 is then conveyed to a location 260 where it is reacted with the second portion 247 comprising reactive pyrolysis vapors that have not been catalytically upgraded. The highly-reactive chemical compounds within the second portion 247 react in a reaction zone 264 with the upgraded mixture 298 to form higher molecular weight, less-reactive species that are more suitable for use in a bio-derived fuel or that may be easily converted to compounds fungible with petroleum-derived transportation fuels. Similar to the embodiment of FIG. 2, the reaction zone in the embodiment of FIG. 3 is a length of conduit. The reaction zone 264 is maintained at a temperature and pressure sufficient to produce the previously mentioned higher molecular weight compounds. Other potential configurations not delineated here are possible and contemplated, with the common feature of reacting a portion of unreacted pyrolysis vapors with the partially upgraded portions to produce a range of higher molecular weight compounds.

As noted above, it is common for the biomass feedstock to include measurable amounts of metals that act as poisons to desirable upgrading catalysts, and we have found that this metal content becomes concentrated in the char produced during pyrolysis. With the physical arrangement described herein and exemplified in FIG. 2, downstream upgrading catalyst(s) 42 that are more susceptible to poisoning by metals may be used to upgrade the pyrolysis vapors 37, since the impact of metal poisoning and coke formation is dramatically reduced. In addition, the product leaving the upgrading reactor 40 is free of solids and metals, thereby eliminating the need for subsequent particle removal.

The pyrolysis reactor preferably comprises at least one auger and may take many forms. In one embodiment, a single rotating auger transports sand, biomass and solid pyrolysis products through an elongated, cylindrical reactor. In the embodiment depicted in FIG. 1, two augers 22 operating in parallel are utilized. Additional augers may prove useful depending upon the size of the reactor and the quantity of biomass feedstock 12 to be conveyed through the reactor 20.

The temperature within the pyrolysis reactor may be maintained via one or more of several mechanisms, such as heating of the reactor walls, heating of the at least one auger, microwave or inductive heating, addition of a heated sweep gas, microwave heating, and addition a of a solid particulate heat carrier that has been pre-heated to a temperature of at least 480° C. Regardless of the heating mechanism utilized, preferably the pyrolysis reactor and its contents are maintained at a temperature of at least 315° C.

To reduce heat carrier particle entrainment leading to heat carrier exiting the reactor, the median heat carrier particle size is greater than about 100 microns, preferably greater than about 250 microns and most preferably greater than 300 microns. For similar reasons, the bulk density of the heat carrier particles is at least 500 kg/m$^3$, and preferably greater than about 1,000 kg/m$^3$.

Conventional pyrolysis methods and systems have suffered from either 1) char carry-over in the pyrolysis vapors, which leads to deactivation of upgrading catalysts, or 2) use of mechanical separation devices to remove char from pyrolysis vapors, resulting in an undesirable delay prior to catalytic upgrading. This delay can allow secondary reactions to occur that produce larger products comprising 16 or more carbons that are difficult to upgrade into a transportation fuel.

Referring to the embodiment depicted in FIG. 1, a "disengagement zone" 45 is located proximal to the second end portion 28 of the pyrolysis reactor 20, and near the first outlet 32. This zone is designed to provide a space where the upward local velocity of the pyrolysis vapors 37 prior to passing through the first outlet 32 is sufficient to entrain less than 0.5% (by wt.) of the char produced by the pyrolysis of the biomass feedstock. In certain embodiments, the upward local velocity of the primary pyrolysis product 37 prior to passing through the first outlet 32 is sufficient to entrain less than 0.1% (by wt.) of the char produced by the pyrolysis of the biomass feedstock. Achieving this low percentage of char carryover requires designing the height and diameter of the disengagement zone to allow the terminal falling velocity of the char and heat carrier particles to exceed the upward local velocity of the primary pyrolysis product exiting the first outlet 32. This results in nearly all char particles being retained in the pyrolysis reactor, thereby preventing these particles from contacting the upgrading catalyst.

As previously mentioned, in certain embodiments a sweep gas is employed that may comprise one or more of many gases that are either inert or reactive. For example, the sweep gas may comprise gases such as nitrogen, helium, argon, hydrogen, methane and mixtures thereof. If the sweep gas comprises a reactive gas, the reactive gas may optionally react with the biomass during pyrolysis, may serve as a reactant when the pyrolysis products are upgraded by contacting the upgrading catalyst(s), or both. The sweep gas may be injected into the system at more than one point, or injected simultaneously at multiple points. One point may comprise combining the sweep gas with the feedstock prior to entering the pyrolysis reactor, while another may comprise injecting sweep gas directly into the pyrolysis reactor proximal to the biomass feedstock inlet. A third point may comprise injecting the sweep gas proximal to the first outlet of the pyrolysis reactor. This may be preferable if the sweep gas is to be used as a reactant during upgrading of the primary pyrolysis product.

In certain embodiments, a gas may be injected just upstream of the pyrolysis reactor first outlet in order to 1) assist in preventing entrained char and heat carrier particles from leaving the pyrolysis reactor, 2) quench the primary pyrolysis product to a lower temperature, 3) heat the primary pyrolysis product to a higher temperature, or combinations thereof. In embodiments where the sweep gas serves to quench the primary pyrolysis product, such quenching may prevent coking. Embodiments where the sweep gas serves to heat the primary pyrolysis product may prevent formation of char and secondary pyrolysis reactions that may reduce the subsequent upgradability of the primary pyrolysis product to a bio-derived fuel. However, quenching is limited such that the quenched primary pyrolysis product does not condense prior to contacting the upgrading catalyst(s). Typically, this requires that the quenched pyrolysis vapors maintain a temperature of at least 250° C. to prevent condensation to liquid phase.

The volumetric flow rate, or "standard gas hourly space velocity" (SGHSV) of the sweep gas is adjusted to minimize the time between pyrolysis and catalytic upgrading, such that the upgrading catalyst (or optionally, catalysts) contacts primary products of pyrolysis comprising 35 carbons or less, preferably 30 carbons or less, and not larger secondary products comprising that are more difficult to upgrade to a bio-derived transportation fuel. Volumetric flow rate for a given embodiment depends upon factors including, but not limited to, the volume of the pyrolysis reactor, the temperature and pressure at which the pyrolysis reactor is maintained, the feed rate of the biomass feedstock to the pyrolysis reactor, and the type of feedstock utilized. A paper by J. N. Brown, et al. provides one example of how these variables can be adjusted to determine an optimal volumetric flow rate for a desired pyrolysis outcome, including, for example, the pyrolysis liquid to pyrolysis gas ratio, and the relative percentage of the feedstock converted to char.

The pressure maintained within the pyrolysis reactor is generally within a range of about 0 psig to 3000 psig. Preferably, the pyrolysis reactor is maintained at a pressure in the range of 100 psig to 500 psig to increase throughput of biomass feedstock, and in certain embodiments, facilitate catalytic upgrading of the primary pyrolysis product.

Minimizing residence time between production of the pyrolysis vapors in the pyrolysis reactor and subsequent contacting with an upgrading catalyst located downstream from the pyrolysis reactor is important for maximizing the percentage of the pyrolysis vapors that are successfully upgraded. Conditions of temperature and pressure, as well as reactor dimensions are chosen to assure this residence time is less than 5 seconds, preferably less than 3 seconds, more preferably less than 1 second, even more preferably less than 0.3 second and most preferably less than 0.1 second. Minimizing this residence time prevents the occurrence of secondary pyrolysis reactions that form larger oxygenated species comprising 16 or more carbon atoms. These larger oxygenated species are more likely to be converted to coke and deposit within the system, which is extremely detrimental and fouls heat carrier, process equipment and downstream upgrading catalysts. Additionally, diversion of the primary pyrolysis product into secondary pyrolysis reactions decreases the conversion efficiency of the feedstock into smaller species that are more easily upgraded. For the same reasons, it is preferred that the residence time between the formation of the unreacted portion comprising raw pyrolysis vapors (that have not been catalytically upgraded) and the reacting of the unreacted portion with the one or more portion(s) comprising upgraded fuel intermediate occurs within less than 1 sec. after formation of the unreacted portion. More preferably, the reacting occurs within less than 0.25 seconds, and most preferably within less than 0.1 seconds.

The physical distance between the pyrolyzer and the upgrading catalyst(s) contained within the one or more upgrading reactors may vary, but is preferably minimized, taking into consideration the space velocity of the primary pyrolysis vapors (optionally in a mixture with a sweep gas) out of the pyrolysis reactor. Minimizing this distance assists in decreasing the time between production of the primary pyrolysis vapors and subsequent contacting with one or more upgrading catalyst(s). Through optimizing the variables of distance and space velocity, the current invention assures that the upgrading catalyst contacts and catalytically upgrades primary product compounds from pyrolysis and not secondary products created by non-preferred reactions occurring after production of the pyrolysis vapors. Generally, the distance between the pyrolyzer and the upgrading catalyst(s) is less than 4 ft. More preferably, this distance is less than 1 ft., and most preferably, less than 6 inches.

Optionally, the disengagement zone located near the at least one outlet of the pyrolyzer may include additional features to limit reactivity of the pyrolysis vapors prior to contact with the upgrading catalyst(s). Such features may include, but are not limited to, temperature control, introduction of a gas or fluid to quench the primary pyrolysis product (as mentioned previously), flow control through judicious choices in geometry (preferably, a geometry minimizing bends and small orifices to decrease the potential for vapor condensation, the presence of a pre-catalyst (such as zeolite monolith, or any of the above-mentioned upgrading catalysts) at the interface between reactors.

The at least one upgrading reactor may utilize any type of reactor configuration including, but not limited to, fixed bed, bubbling bed, circulating bed, moving bed, ablative, vacuum, microwave heated, plasma-heated, counter-current, or combinations of one or more of these configurations. The catalyst may be periodically removed from the upgrading reactor and passed through a regenerator for de-coking as needed, then returned to the pyrolysis reactor. Optionally, fresh catalyst may be added on a periodic or continuous basis to the pyrolysis reactor to account for catalyst attrition.

Examples of some upgrading catalysts that may be useful for the present invention, along with typical reaction conditions are disclosed in U.S. patent application Ser. No. 13/416,533, although any catalyst known to catalyze the conversion of biomass-derived pyrolysis products to a fuel range hydrocarbon or an intermediate compound may be utilized. The upgrading catalyst may include, but is not limited to, zeolites, metal modified zeolites, and other modified zeolites. Other catalysts may include forms of alumina, silica-alumina, and silica, unmodified or modified with various metals, not limited but including, Nickel, Cobalt, Molybdenum, Tungsten, Cerium, Praseodymium, Iron, Platinum, Palladium, Ruthenium and Copper or mixtures thereof. Still other catalysts may include unsupported metals, supported or unsupported metal oxides or metal phosphides, and mixtures thereof. Catalyst types include deoxygenation catalysts, hydrogenation catalysts, hydrodesulfurization catalysts, hydrodenitrogenation catalysts, hydrocracking catalysts, water-gas-shift catalysts, and condensation catalysts. Catalysts may be sulfided or unsulfided.

In certain embodiments employing a hydrogenation catalyst as an upgrading catalyst, the hydrogenation catalyst may selected from the group consisting of ceria (Ce), magnesium (Mg), nickel (Ni), cobalt (Co), gold (Au), iridium (Ir), osmium (Os), palladium (Pd), platinum (Pt), rhodium (Rh), ruthenium (Ru) and combinations thereof. In certain embodiments employing a condensation catalyst as an upgrading catalyst, the catalyst is selected from the group consisting of alumina, silica, silica-alumina, zirconia, titania, ceria, manganese oxide, magnesium, praseodymium oxide, samarium oxide, and combinations thereof. Optionally, the condensation catalyst comprises a promoter metal selected from the group consisting of copper (Cu), nickel (Ni), cobalt (Co), Iron (Fe), gold (Au), iridium (Ir), osmium (Os), palladium (Pd), platinum (Pt), rhodium (Rh), and combinations thereof. In certain embodiments employing a polishing catalyst as an upgrading catalyst, the polishing catalyst is selected from the group consisting of molybdenum (Mo), tungsten (W), cobalt (Co), nickel (Ni), NiW, NiMo, NiMoW, CoMo and combinations thereof. The polishing catalyst may be associated with a solid support material that may include carbon, alumina, silica, zeolite, ceramic, $Al_2O_3$, and other known solid support materials.

In certain embodiments, each upgrading catalyst bed may comprise mixtures of one or more catalysts of the types described above. Optionally, multiple upgrading catalyst beds may be placed within a single reactor and operated in series, or as a mixture of upgrading catalysts. Alternatively, or multiple upgrading catalyst beds may be operated in different reactors, in parallel or series to facilitate different upgrading pathways. If multiple upgrading reactors are utilized, different conditions may be maintained in each reactor in order to facilitate a given catalytic reaction. To facilitate flow of the pyrolysis vapors through multiple reactors, a pressure differential may be maintained wherein the pressure in each successive reactor progressively decreases.

The residence time of the pyrolysis vapors in each upgrading reactor generally ranges from 0.01 sec to 1000 sec. Preferably, the residence time is in a range from 0.05 sec to 400 secs. More preferably, the residence time is in a range from 0.1 sec to 200 sec. Most preferably, the residence time is in a range from 0.1 sec to 100 sec.

The temperature maintained within each upgrading reactor is generally in the range from 72° F. to 1500° F. Preferably, the temperature is in the range from 100° F. to 1000° F., although if multiple upgrading reactors are used, each may be maintained at a different temperature within this range.

Certain upgrading reactions are advantageously conducted at a pressure that is greater than atmospheric pressure. The pressure that is maintained in the one or more upgrading reactors may range from 0-3000 psig, although a preferred pressure range is zero to 1000 psig. In certain embodiments, the pressure may range from 10 to 800 psig, from 20 to 650 psig, from 100 to 500 psig. An exemplary pressure might be 400 psig.

The flow of gas and vapors within each upgrading reactor is preferably upward, although downward or lateral gas flow may also be utilized. Upon exiting the final upgrading reactor, the upgraded product comprising a bio-derived fuel, fuel component or upgraded fuel intermediate may be directed to a condensation system that functions to reduce the product temperature to a temperature that is at or below the dew point for at least one component of the product, thereby allowing the biofuel or upgraded fuel intermediate to condense to a liquid. Typically, the conditions utilized do not result in the condensation of methane, but preferably will condense hydrocarbons containing four or more carbons. Hydrogen may be separated from the non-condensed gas by a variety of conventional methods and recycled as the sweep gas. In certain embodiments, the recycled hydrogen may be added directly into, or just upstream from, an upgrading reactor to facilitate one or more upgrading reactions. Alternatively, the entirety, or some fraction, of the bulk non-condensable gas is used for this same purpose. In another embodiment, the entirety, or some fraction, of the bulk of the non-condensable gas is sent to a combustor or hydrogen generation unit (e.g., a reformer) to generate either heat or hydrogen, respectively. The resulting heat or hydrogen may then be partially or entirely recycled back to the process.

In some embodiments, the upgraded gas stream will be further processed to collect condensed liquids. The condensed liquids can either be used directly as transportation fuel, further blended to make a finished transportation fuel or used as feedstock for chemical production such as commodity chemicals, pharmaceuticals or plastics. The catalytic effect on the upgraded pyrolysis vapors may result in a condensed liquid product having a lower or higher molecular weight, a lower oxygen content, a lower water content and/or an altered range of organic chemical species when compared to gas streams that have not been catalytically upgraded.

Hypothetical Example

Upon combining and reacting at least one partially-upgraded stream of pyrolysis vapors with a stream of non-upgraded pyrolysis vapors, a series of reactions take place that increase the molecular weight and carbon number of the product compounds. Chemical reactions taking place may include condensation, dimerization, oligomerization, and alkylation, among others. The increase in average molecular weight resulting from the reacting of these streams is limited by the relative abundance of reactive functional groups in the partially-stabilized streams of pyrolysis vapors. Examples of such reactive functional groups include, but are not limited to, aldehydes, ketones, alcohols. Olefins also are conducive to reactions leading to products of increased molecular weight in the inventive process. The reaction pathways provided below are intended as non-limiting examples demonstrating how certain oxygenated hydrocarbons present in primary pyrolysis vapors can be converted to molecules having molecular weights in the gasoline, diesel and gasoil boiling range and suitable for use as a hydrocarbon transportation fuel.

Definitions

As used herein, the term "entrainment" is defined as transport of a solid particle by a gas stream. Entrainment of a given solid particle typically occurs when the local velocity of a gas stream exceeds the terminal falling velocity of the particle.

As used herein, the term "standard gas hourly space velocity" or "SGHSV" refers to the gas hourly space velocity of a gas stream measured at standard conditions.

As used herein, the term "stabilizing" means removing at least a portion of the reactive functional groups or moieties present on the chemical compounds found in pyrolysis vapors.

As used herein, the term "fuel component" is defined as . . .

As used herein, the term "transportation fuel" is defined as fuels having carbon numbers within the range of molecules suitable for use in hydrocarbon transportation fuels, including gasoline, kerosene, jet fuel, diesel #1, #2 or #4 and light fuel oil.

As used herein, the term "upgrading catalyst" is defined as any catalyst that facilitates chemical reactions within the molecules present in pyrolysis vapors (resulting from fast-pyrolysis of biomass) that converts them to products suitable for use in a transportation fuel, a transportation fuel component, or that converts them to intermediate products (including stabilized, less reactive intermediate products) that are more easily further converted to a transportation fuel or transportation fuel component.

In closing, it should be noted that the discussion of any reference is not an admission that it is prior art to the present disclosure, in particular, any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those having skill in the art may be able to study the preferred embodiments and identify additional variants of the invention that are not exactly as described herein, but that remain within the scope of the claims. The description, abstract and drawings are not intended to limit the scope of the invention. Instead, the invention is specifically intended to be as broad as the claims below and their inventive equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. Brown, J. N., et al. "Process Optimization of an Auger Pyrolyzer with Heat Carrier Using Response Surface Methodology." Biores. Tech. 103:405-4141(2012).

The invention claimed is:

1. A process for producing biomass-derived hydrocarbon fuel or a component thereof, comprising the steps:
   (a) pyrolyzing a biomass feedstock to produce pyrolysis vapors and char, and obtaining at least a first portion of the pyrolysis vapors and a second portion of the pyrolysis vapors from the produced pyrolysis vapors;
   (b) at least partially stabilizing the first portion of the pyrolysis vapors by reacting the first portion of the pyrolysis vapors with at least one catalyst that decreases a concentration of reactive functional groups within the first portion of the pyrolysis vapors to produce stabilized pyrolysis vapors having lower concentration of the reactive functional groups than the first portion of the pyrolysis vapors, wherein the time between the production of the pyrolysis vapors of step (a) and the reacting of the first portion of the pyrolysis vapors with the at least one catalyst is less than five seconds, wherein the first portion of the pyrolysis vapors is maintained in vapor phase prior to and during the reacting, and wherein the reactive functional groups include at least one of aldehydes, ketones and alcohols;
   (c) reacting the stabilized pyrolysis vapors with the second portion of the pyrolysis vapors, wherein the reacting of the second portion of the pyrolysis vapors with the stabilized pyrolysis vapors occurs at a temperature and a pressure sufficient to facilitate chemical reactions between molecules in the stabilized pyrolysis vapors and the second portion of the pyrolysis vapors, thereby producing hydrocarbon molecules characterized by boiling points within boiling ranges of gasoline, diesel and gasoil and that are suitable for use as a hydrocarbon transportation fuel or that are easily converted to compounds fungible with petroleum-derived transportation fuels, wherein the time between the production of the pyrolysis vapors of step (a) and the reacting of the second portion of the pyrolysis vapors with the stabilized pyrolysis vapors is less than five seconds, and wherein the second portion of the pyrolysis vapors is maintained in vapor phase prior to and during the reacting of the second portion of the pyrolysis vapors with the stabilized pyrolysis vapors.

2. The process of claim 1, wherein the reacting of step (c) occurs in less than 1 second after the obtaining of step (a).

3. The process of claim 1, wherein the reacting of step (c) occurs in less than 0.1 seconds after the obtaining of step (a).

4. The process of claim 1, wherein the at least one catalyst comprises multiple catalysts that are arranged in parallel, in series, or as mixtures of catalysts in one or more reaction zones.

5. The process of claim 4, wherein the multiple catalysts contact the first portion of the pyrolysis vapors under different reaction conditions wherein each catalyst is in a reaction zone maintained at a temperature and a pressure that optimize reactions taking place therein.

6. The process of claim 4, wherein at least one of catalyst component contained in the multiple catalysts facilitates reactions other than stabilization.

7. The process of claim 1, further comprising hydrotreating the hydrocarbon molecules produced in step (c) to produce a hydrotreated hydrocarbons characterized by boiling points within boiling ranges of gasoline, diesel and gasoil and suitable for use as a hydrocarbon transportation fuel.

8. The process of claim of claim 1, wherein the pyrolysis vapors comprise one or more of aromatic monomers, furan monomers, anhydrosugar monomers, olefins, alcohols, aldehydes, carboxylic acids, ketones, ethers, esters and hydrocarbons.

* * * * *